United States Patent [19]

Kumar

[11] Patent Number: 5,631,938
[45] Date of Patent: May 20, 1997

[54] REACTOR INTERNAL PUMP MAINTENANCE COVER

[75] Inventor: Kirti Kumar, San Jose, Calif.

[73] Assignee: General Electric Company, Schenectady, N.Y.

[21] Appl. No.: 642,920

[22] Filed: May 6, 1996

[51] Int. Cl.⁶ ................................................ G21C 19/00
[52] U.S. Cl. ........................... 376/260; 376/277; 376/313
[58] Field of Search .................................... 376/277, 313, 376/260, 361, 370, 372, 203

[56] References Cited

U.S. PATENT DOCUMENTS

| | | | |
|---|---|---|---|
| 5,075,073 | 12/1991 | Dillmann | 376/352 |
| 5,426,675 | 6/1995 | Kumar et al. | 376/203 |
| 5,519,744 | 5/1996 | Relf | 376/370 |

Primary Examiner—Daniel D. Wasil
Attorney, Agent, or Firm—Armstrong, Teasdale, Schlafly & Davis

[57] ABSTRACT

A maintenance cover for use in a nuclear reactor including a pump deck having at least one pump diffuser opening is described. The cover includes, in one embodiment, a substantially cylindrical member having a first end and a second end. The first end has a diameter larger than the diameter of the pump diffuser opening. The substantially cylindrical member includes a substantially cylindrical frame having a plurality of window openings formed therein. Grating is secured to the frame and extends over the window openings. The cover further includes an end member secured to and positioned over the second end of the substantially cylindrical member. The end member also includes grating. A handle is secured to the substantially cylindrical member.

16 Claims, 2 Drawing Sheets

REACTOR INTERNAL PUMP MAINTENANCE COVER

FIELD OF THE INVENTION

This invention relates generally to boiling water nuclear reactors and more particularly to a maintenance cover for covering a diffuser opening in the pump deck the nuclear reactor during maintenance outages.

BACKGROUND OF THE INVENTION

Boiling water nuclear reactors typically include a reactor core located within a reactor pressure vessel (RPV). A known RPV includes a substantially cylindrical shell. The shell, for example, can be about twenty feet in diameter and about seven inches thick. A substantially cylindrical core shroud is positioned within, and spaced from, the shell walls to restrain horizontal movement of the reactor core fuel bundles and provides flow separation between the downcomer and the upward core flow.

A bottom head knuckle, or junction, assembly forms an interface, or junction, between the cylindrical shell and a substantially disk shaped bottom head. Specifically, the bottom head knuckle assembly includes a shroud support subassembly and an annular forging having a top, cylindrical shaped end and a bottom, conical shaped end. The top, cylindrical shaped end of the forging is configured to be welded to one end of the RPV shell and the bottom, conical shaped end of the forging is configured to be welded to the disk shaped bottom head.

The shroud support subassembly includes a shroud support cylinder having an upper surface configured to be welded to the core shroud. An annular pump deck extends from an outer surface of the shroud support cylinder. Shroud support legs extend from the lower surface of the shroud support cylinder. The shroud support legs are welded to weld build-up pads formed on an inner surface of the annular forging.

In boiling water nuclear reactors that include recirculation pumps, which are sometimes referred to as reactor internal pumps (RIPs), RIP shaft penetrations, or accesses, are formed in the annular forging of the knuckle assembly. These penetrations generally are referred to as RIP nozzles. At each nozzle location, a RIP casing is secured to the outer surface of the forging and a pump shaft extends through the nozzle. A pump impeller is secured to the pump shaft and extends through a diffuser opening formed in the annular pump deck.

During reactor maintenance outages, the RIPs may be operated at a minimum speed for mixing vessel water. During such an outage, however, tools and other equipment in the RPV may be drawn toward and possibly into the RIP diffusers. Of course, such equipment can significantly damage the RIP. In addition, during such maintenance outages, there is a potential for objects, such as tools, underwater lights and cameras, to be dropped into a difficult to reach space between the shroud support legs and the annular forging. Removal of such objects could require draining the RPV, removal of the RIPs, and underwater searching. These operations are extremely time consuming and can extend a planned outage.

Of course, extending a planned outage to repair an RIP or remove a dropped object typically is extremely expensive. In addition, if workers are required to perform certain operations such as removal of damaged pumps, worker radiation exposure can also be increased.

It would be desirable to prevent objects from being drawn into the RIP diffuser and from falling into the space between the shroud support legs and the annular forging, during maintenance and other outages. It also would be desirable to reduce the potential for having to extend a planned outage and prevent any unnecessary worker radiation exposure.

SUMMARY OF THE INVENTION

These and other objectives may be attained in a maintenance cover for use in a nuclear reactor including a pump deck having at least one pump diffuser opening having a first diameter. The cover includes, in one embodiment, a substantially cylindrical member having a first end and a second end. The first end has a diameter larger than the diameter of the pump diffuser opening. The substantially cylindrical member further includes a substantially cylindrical frame having a plurality of window openings formed therein. Grating is secured to the frame and extends over the window openings.

The cover further includes an end member secured to and positioned over the second end of the substantially cylindrical member. The end member also includes grating. A handle is secured to substantially cylindrical member.

To use the cover, the cover is lowered into the reactor pressure vessel, and the cover is positioned over the diffuser opening. More specifically, a RIP handling tool can be used to grip the cover handle and lower the cover within the RPV to the pump deck. The cover is positioned so that the cover first end rests on the pump deck and so that flow through the pump deck opening also flows through the cover.

The above described cover prevents objects from being drawn into the RIP diffuser and from falling into the space between the shroud support legs and the annular forging, during maintenance and other outages. The cover therefore reduces the potential for having to extend an outage and facilitates preventing any unnecessary worker radiation exposure.

DETAILED DESCRIPTION OF THE DRAWINGS

Figure 1:
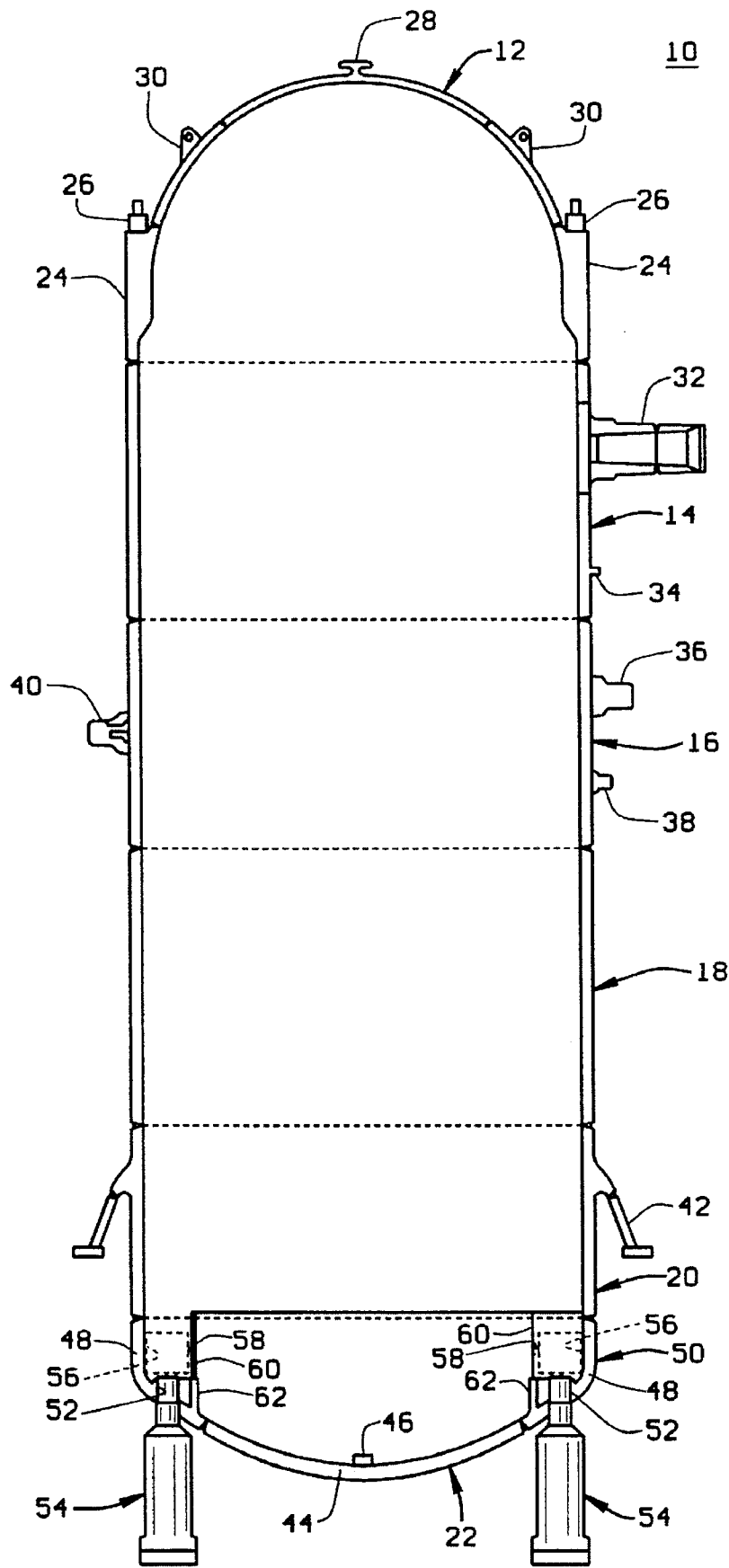
FIG. 1 is a schematic illustration of a reactor pressure vessel.

FIG. 1 is a schematic illustration of a reactor pressure vessel (RPV) 10. RPV 10 includes a top head 12, four substantially cylindrical shell courses 14, 16, 18 and 20, and a bottom head assembly 22. Top head 12 includes a head flange 24. Top head 12 is bolted to first shell course 14 by bolts 26 which extend through head flange 24. Top head 12 also includes a head spray and vent nozzle 28 and lifting flanges 30 used when lifting top head 12 from first shell course 14.

First shell course 14 includes main steam nozzles 32 through which steam flows out of the RPV 10. Stabilizer brackets 34 also are formed on first shell course 14. Second shell course 16 has a number of nozzles 36, 38 and 40 formed therein. Nozzles 36, 38 and 40 include both inlet and outlet nozzles. Fourth shell course 20 includes a support skirt 42 welded thereto. Support skirt 42 is utilized to support RPV 10 within the reactor housing (not shown).

Bottom head assembly 22 includes a bottom head dome 44 having a plurality of control rod drive housing penetrations with stub tubes 46 (only one stub tube 46 is shown in FIG. 1) formed therein. Bottom head dome 44 is welded to an annular forging 48 of a bottom head knuckle assembly 50. Bottom head knuckle assembly 50 includes a plurality, e.g., ten, of nozzles 52. RIPs 54 are secured to knuckle assembly 50 at nozzles 52 and pump diffusers 56 extend through diffuser openings in a pump deck 58 of assembly 50. Pump deck 58 extends from a cylindrical shroud support 60 having legs 62 supported on and welded to annular forging 48. FIG. 1 is provided primarily for illustrative purposes to show a typical RPV 10 including knuckle assembly 50 which forms part of bottom head assembly 22.

When maintenance is to be performed in RPV 10, top head 12 is removed by removing bolts 26 and lifting top head from lifting flanges 30 using a crane. Once top head 12 is removed, maintenance operations can be performed on components within RPV 10 from the refueling floor (not shown).

During such outages, RIPs 54 may be operated at a minimum speed for better mixing of vessel water. During an outage, however, there is a potential for objects to be drawn into diffuser 56 and for objects to be dropped into the space between shroud support legs 62 and annular forging 48. Such objects could damage RIPs 54. In addition, removal of such objects could require draining RPV 10, removal of RIPs 54, and underwater searching. These operations are extremely time consuming and can extend a planned outage. Of course, extending a planned outage typically is extremely expensive. If workers are required to perform certain operations such as removal of pumps, worker radiation exposure can also be increased due to attempts to remove dropped object in such spaces.

Figure 2:
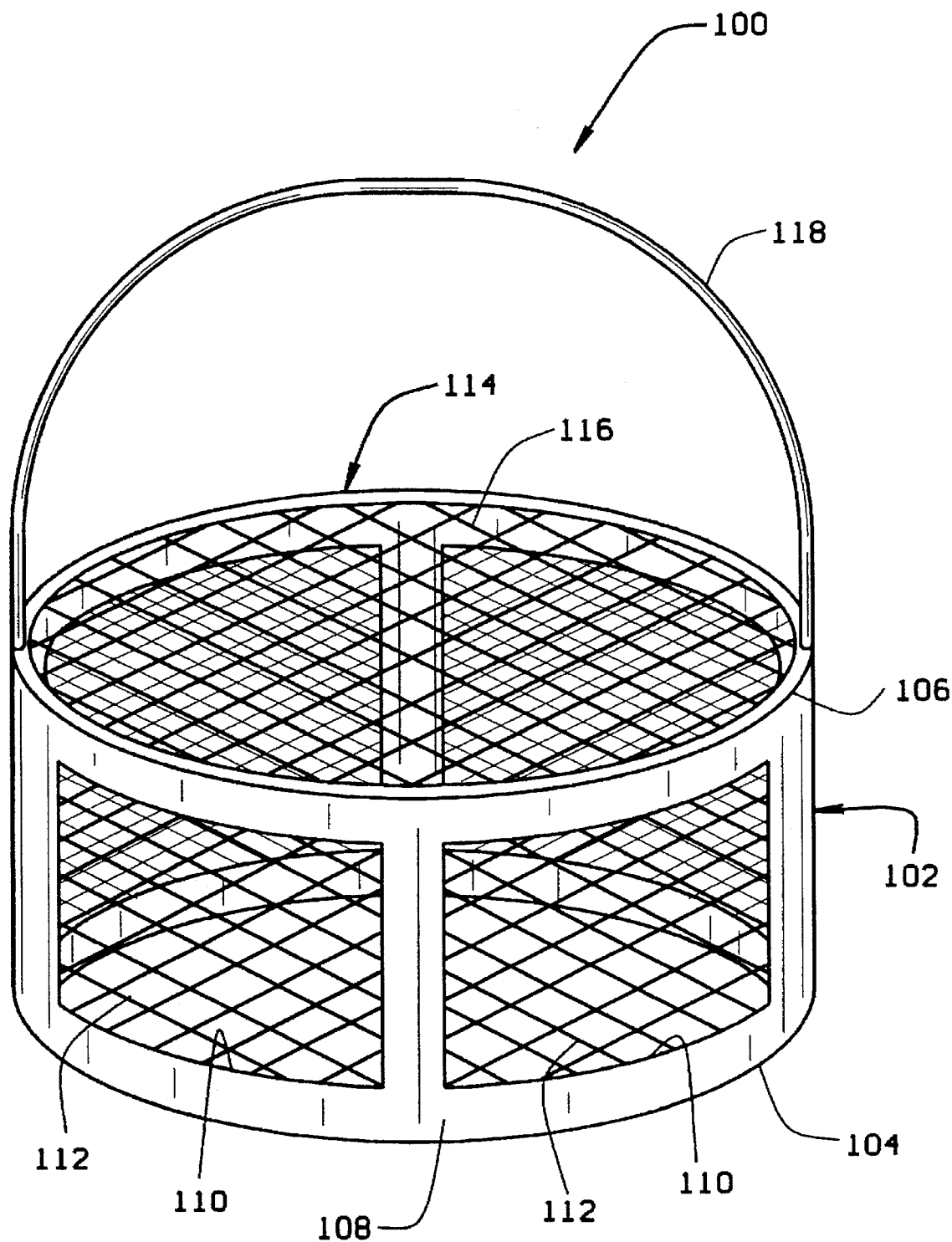
FIG. 2 is a perspective view of a maintenance cover in accordance with one embodiment of the present invention.

FIG. 2 is a perspective view of a maintenance cover 100 configured to substantially prevent objects from being drawn into pump diffuser 56 and from being dropped into the space between shroud support legs 62 and annular forging 48 (FIG. 1). Specifically, cover 100 includes a substantially cylindrical member 102 having a first end 104 and a second end 106. First end 104 has a diameter larger than the diameter of pump diffuser opening in pump deck 58 (FIG. 1). Substantially cylindrical member 102 further includes a substantially cylindrical frame 108 having a plurality of windows, or flow, openings 110 formed therein. Grating 112 is secured, e.g., welded, to frame 108 and extends over window openings 110.

Cover 100 further includes an end member 114 secured to and positioned over second end 106 of substantially cylindrical member 102. End member 114 also includes grating 116, and grating 116 is secured, e.g., welded, to substantially cylindrical member 102. A handle 118 also is secured to substantially cylindrical member 102.

To use cover 100, cover 100 is lowered into reactor pressure vessel 10, and cover 100 is positioned over the diffuser opening in pump deck 58. More specifically, an RIP handling tool (not shown) can be used to grip cover handle 118 and lower cover 100 within RPV 10 to pump deck 58. Cover 100 is positioned so that cover first end 104 rests on pump deck 58 and so that flow through the pump deck opening also flows through cover 100.

In one embodiment, pump diffuser 56 extends through the pump diffuser opening in pump deck 58. The pump diffuser portion extends through the pump diffuser opening to a first height above pump deck 58, and substantially cylindrical member 102 has a second height greater than the first height. Therefore, a portion of pump diffuser 56 is located within cover 100. As one specific example, substantially cylindrical member 102 of cover 100 has a diameter of approximately about 700 mm, a height of approximately about 400 mm, and weigh approximately about 50 kg. Cover 100 may be entirely constructed from stainless steel, for example.

It is contemplated that separate covers 100 would be placed over each diffuser opening in pump deck 58 during a maintenance outage. With the cover configuration described above, it is expected that RIPs 54 could operate at low speeds, e.g., 450 r.p.m., even with covers 100 in place to allow continued water flow. For example, water would flow from the vessel downcomer region to the vessel bottom head region during such operation. Although water may flow through covers 100, covers 100 would prevent any tools, underwater lights and cameras, cables, ropes and other components from being drawn into, and affecting, RIPs 54. In addition, if a tool or other component is dropped, covers 100 would prevent such dropped components from damaging pump diffusers 56 and entering into the difficult to reach space between shroud support legs 62 and annular forging 48 (FIG. 1). Cover 100 therefore reduces the potential for having to extend a planned outage and facilitates preventing any unnecessary worker radiation exposure.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

What is claimed is:

1. A maintenance cover for use in a nuclear reactor including a pump deck having at least one pump diffuser opening having a first diameter, said cover comprising:

a substantially cylindrical member having a first end and a second end, said first end having a second diameter, said second diameter being at least equal to the first diameter; and an end member secured to and positioned over said second end of said substantially cylindrical member.

2. A maintenance cover in accordance with claim 1 wherein said substantially cylindrical member has a plurality of flow openings formed therein.

3. A maintenance cover in accordance with claim 1 wherein said substantially cylindrical member comprises a substantially cylindrical frame having a plurality of window openings formed therein, said substantially cylindrical member further comprising grating secured to said frame and extending over said window openings.

4. A maintenance cover in accordance with claim 1 wherein the nuclear reactor further includes a pump diffuser extending through the pump diffuser opening, the pump diffuser portion extending through the pump diffuser opening to a first height, and said substantially cylindrical member having a second height greater than the first height.

5. A maintenance cover in accordance with claim 1 further comprising a handle secured to said substantially cylindrical member.

6. A maintenance cover in accordance with claim 1 wherein said end member comprises grating, said end member grating being welded to said substantially cylindrical member.

7. A cover for use in a nuclear reactor including a pump deck having at least one pump diffuser opening having a first diameter, said cover comprising grating configured to be positioned over the diffuser opening, said grating configured to allow water flow therethrough and to substantially prevent tools from passing therethrough.

8. A cover in accordance with claim 7 further comprising a substantially cylindrical frame having a plurality of window openings formed therein, said grating secured to said frame and extending over said window openings.

9. A cover in accordance with claim 8 wherein said substantially cylindrical member has a first end and a second end, said first end having a second diameter, said second diameter being at least equal to the first diameter.

10. A cover in accordance with claim 8 further comprising an end member secured to and positioned over said second end of said substantially cylindrical member.

11. A cover in accordance with claim 10 wherein said end member comprises grating, said end member grating welded to said substantially cylindrical member.

12. A cover in accordance with claim 8 wherein the nuclear reactor further includes a pump diffuser extending through the pump diffuser opening, the pump diffuser portion extending through the pump diffuser opening to a first height, and said substantially cylindrical member having a second height greater than the first height.

13. A cover in accordance with claim 8 further comprising a handle secured to said substantially cylindrical member.

14. A method for preventing objects from falling into the diffuser space in a reactor pressure vessel of a nuclear reactor, the nuclear reactor including a pump deck having at least one pump diffuser opening, the diffuser opening having a first diameter, said method comprising the steps of:

lowering a cover into the reactor pressure vessel, and positioning the cover in preventive position over the diffuser opening, whereby the lower end of the cover is above the diffuser opening.

15. A method in accordance with claim 14 wherein the cover has a first end and a second end, the first end having a second diameter, the second diameter being at least equal to the first diameter, and positioning the cover in preventive position over the diffuser opening comprises the step of resting the cover first end on the pump deck so that flow through the pump deck opening flows through the cover.

16. A method in accordance with claim 14 wherein the cover includes handle and lowering the cover into the reactor pressure vessel comprises the step of gripping the handle with a handling tool.

* * * * *